A. R. FRISZ.
CULINARY UTENSIL.
APPLICATION FILED JUNE 12, 1911.
1,010,037.
Patented Nov. 28, 1911.
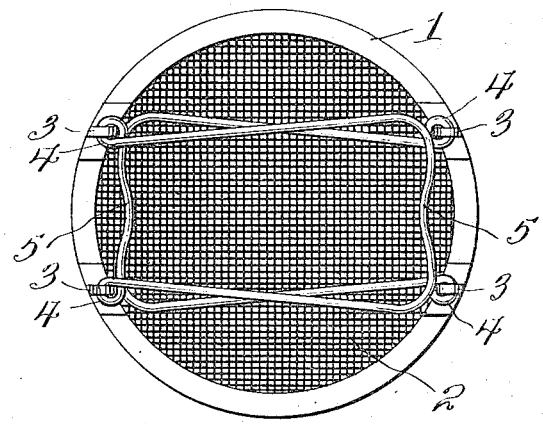
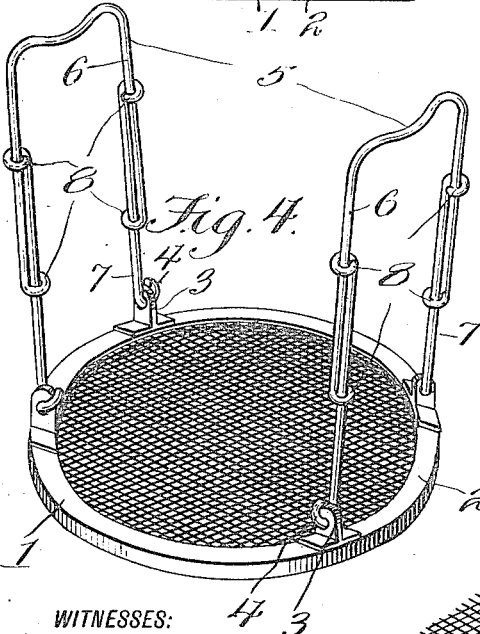
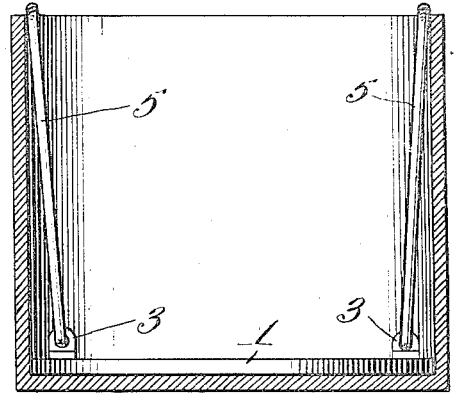
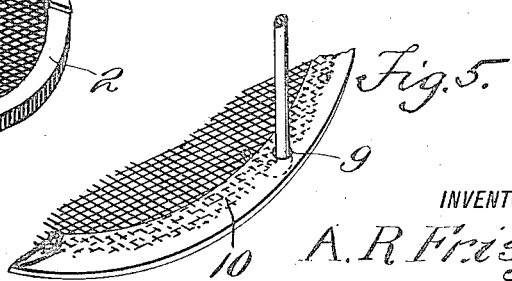
WITNESSES:
J. T. L. Wright
C. H. Crawford
INVENTOR
A. R. Frisz,
BY
Gould & Gould
ATTORNEYS

UNITED STATES PATENT OFFICE.

ANNA R. FRISZ, OF TERRE HAUTE, INDIANA.

CULINARY UTENSIL.

1,010,037. Specification of Letters Patent. Patented Nov. 28, 1911.

Application filed June 12, 1911. Serial No. 632,814.

*To all whom it may concern:*

Be it known that I, ANNA R. FRISZ, a citizen of the United States, residing at Terre Haute, in the county of Vigo and State of Indiana, have invented certain new and useful Improvements in Culinary Utensils, of which the following is a specification.

The invention relates generally to culinary utensils, being directed specifically to a combination lifter and strainer designed to be employed as an auxiliary implement in conjunction with a cooking vessel primarily adapted for retaining food while the latter is being cooked.

The salient features of the invention reside in a body portion adapted to rest upon the bottom of a cooking vessel and receive the food to be cooked and embracing a permeable element designed to strain the liquid portion of the cooked food as the latter is lifted, by means of the same device, from said vessel, and in adjustable, foldable lifting handles connected to the body portion whereby the lifter and strainer may be adjusted for use with vessels of different size and also folded into compact, convenient form when found expedient.

The object of the invention is the production of a device whereby lifting and straining food cooked in deep vessels, as in a fireless cooker or the like, may be greatly facilitated, and accomplished in one movement, resulting in an appreciable saving of time and labor over ordinary methods commonly employed wherein the food is not properly and completely strained and which necessitate the lifting thereof from the vessel in portions only at a time, due to the inability of the usual lifting utensils ordinarily employed, such as a fork or straining spoon to secure lifting contact with the cooked food as a whole from beneath the same.

The invention will now be described in the following specification taken in connection with the accompanying drawings, and then more particularly pointed out in the appended claim.

Referring now to the drawings, Figure 1 is a top plan of the improved lifter and strainer showing the handles in folded position. Fig. 2 is a central vertical section of the same. Fig. 3 is a central vertical section of a cooking vessel, showing the lifter and strainer operatively positioned therein. Fig. 4 is a perspective view illustrating the invention in unfolded position, and Fig. 5 is a broken perspective illustrating a modified means of connecting the frame and handles.

Having reference to the drawings, wherein the details of the preferred form of the invention are shown and wherein like characters of reference refer to like parts throughout the several views, 1 denotes the frame of the body portion of the lifter, preferably of circular outline in plan, of sufficient stiffness to obviate accidental bending or twisting in use and to receive and maintain in operative position the lifting and straining element 2 comprising a section of mesh fabric disposed within the frame 1 and tautly secured thereto in any preferred manner.

Secured on the upper face of frame 1 and appropriately positioned thereon is a plurality of bail ears 3, designed to receive and pivotally maintain in operative relation retaining hooks 4 formed on the lower terminals of the lifting handles 5, as clearly shown in Fig. 4. Said handles each include a slidable upper section 6 adapted for longitudinal movement on the lower sections 7 to provide for vertical adjustment in accordance with the height of the vessel in conjunction with which the device is being used, said movement being guided and the sections retained in proper relative position through the medium of retaining loops 8 formed on the lower terminals of the upper handle sections and on the upper terminals of the lower handle sections respectively.

It is evident that if found desirable the handles 5 may be connected to the frame 1 by means of suitably-spaced apertures 9 formed directly in said frame, in which event the bail ears 3 would of course be dispensed with and also that the frame may be formed of a section of material folded upon itself and the lifting and straining element disposed between said folds and securely clamped therein, as at 10, as illustrated in Fig. 5.

It is of course contemplated to make the device of non-rustable material and in different sizes and weights as may be found expedient for use with different cooking vessels.

In operation, after selecting the appropriate size and weight of the device desired, it is placed in the vessel in which the food is to be cooked and the latter placed on the element 2, the construction providing that said food thus placed is incidentally slightly spaced from the bottom of the vessel, as is desired. If found expedient the handles may then be partly folded one upon the other and the lid of the cooking vessel placed in position. When the food is properly cooked it may be, as evident, raised as a whole from the bottom of the vessel and the liquid allowed to drain off through the strainer 2, upon the completion of which operation the food may be conveniently and at one operation lifted from the vessel and deposited where desired.

Having thus described my invention, what I claim as new and desire to secure by Letters Patent, is:—

A culinary lifter and strainer for use with cooking vessels, comprising a frame, a permeable element disposed within the frame to receive and support food to be cooked, and handles connected at diametrically opposite points to the frame, each of said handles being made up in two sections, one section being movably connected to the frame and the other slidably engaging the connected section, the extended relation of the sections providing handles of greater depth than the vessel with which the device is to be used, the collapsed relation of the sections providing handles of a length less than the maximum transverse dimension of the device, whereby when not in use the handles may be folded upon and wholly within the contour of the device and in use may be extended above the vessel with which the device is used.

In testimony whereof, I affix my signature in presence of two witnesses.

ANNA R. FRISZ.

Witnesses:
HELEN SCHMIDT,
BEATRICE BARSAFOU.